United States Patent

[11] 3,623,060

| [72] | Inventor | Newell G. Welch<br>Waynesboro, Va. |
|---|---|---|
| [21] | Appl. No. | 788,741 |
| [22] | Filed | Jan. 3, 1969 |
| [45] | Patented | Nov. 23, 1971 |
| [73] | Assignee | Acme Visible Records Inc.<br>Crozet, Va. |

[54] MOTION DETECTOR
3 Claims, 2 Drawing Figs.

[52] U.S. Cl. .................................................. 340/271,
250/236, 307/311
[51] Int. Cl. ......................................................... G08b 21/00
[50] Field of Search ........................................... 340/271,
228 S, 327; 250/214, 236, 219 DD; 317/124;
307/311

[56] References Cited
UNITED STATES PATENTS

| 2,788,519 | 4/1957 | Caldwell ...................... | 340/271 |
| 2,829,229 | 4/1958 | Metz ........................... | 317/124 X |
| 2,942,249 | 6/1960 | Paull ........................... | 340/327 X |
| 3,146,432 | 8/1964 | Johnson ...................... | 340/271 X |
| 3,276,256 | 10/1966 | Rudasill et al. .............. | 340/271 X |
| 3,366,795 | 1/1968 | Ravitsky et al. ............. | 250/236 |
| 3,421,156 | 1/1969 | Rowell ......................... | 307/311 X |
| 3,487,221 | 12/1969 | Frank ........................... | 307/311 X |
| 3,402,327 | 9/1968 | Blackburn .................... | 340/271 UX |
| 3,436,637 | 4/1969 | Ehret ............................ | 340/271 UX |

*Primary Examiner*—Donald J. Yusko
*Assistant Examiner*—Michael Slobasky
*Attorney*—Gary, Juettner, Pigott & Cullinan

ABSTRACT: A motion detector system for indicating the stopping of a rotary member being monitored including a circuit having a light-sensitive element, means operably coupled to the rotary member for periodically impinging a light beam on the light-sensitive element and an alarm means included in said circuit operable in response to the removal of the light beam from the light-sensitive element in accordance with the stopping of the rotary member.

PATENTED NOV 23 1971

3,623,060

INVENTOR
NEWELL G. WELCH

By Gary, Parker,
Juettner, Pigott,
and Cullinan
ATTORNEY

MOTION DETECTOR

BACKGROUND OF THE INVENTION

The present invention relates to a motion detector system and more particularly to a circuit for indicating the stopping of a rotating member being monitored.

In many business and manufacturing operations, conveyor systems are conventionally used to transport materials from one location to another. Most often the entire operation is dependent upon the continuous functioning of these conveyor systems. Therefore, it is highly desirable that an immediate indication of such a system breakdown be provided to facilitate repair and restoration of the system to normal service.

SUMMARY OF THE INVENTION

Most conveyor systems include drive means to move the conveyor such as motors, pulleys, sprockets and/or similar devices. The present invention is directed to an electronic circuit adapted to detect rotary motion, such as the rotary motion of a conveyor drive means and is operable to provide an alarm signal when the rotary motion of a member being monitored stops. The member is provided with a means adapted to periodically impinge a light beam from a source to a light-sensitive circuit element. When the rotary member stops, the light signal is no longer applied to the circuit and it is deenergized to give an alarm signal.

Among the objects of the present invention are the provisions of a motion detector system wherein an alarm signal is provided when a rotary member being monitored is stopped and the provision of a motion detector system which will provide a signal no matter in what position the rotary member being monitored stops.

Other objects and further applicability of the present invention will become more apparent when taken in conjunction with the accompanying drawings.

DESCRIPTION OF THE PREFERRED EMBODIMENT

Figures 1, 2:
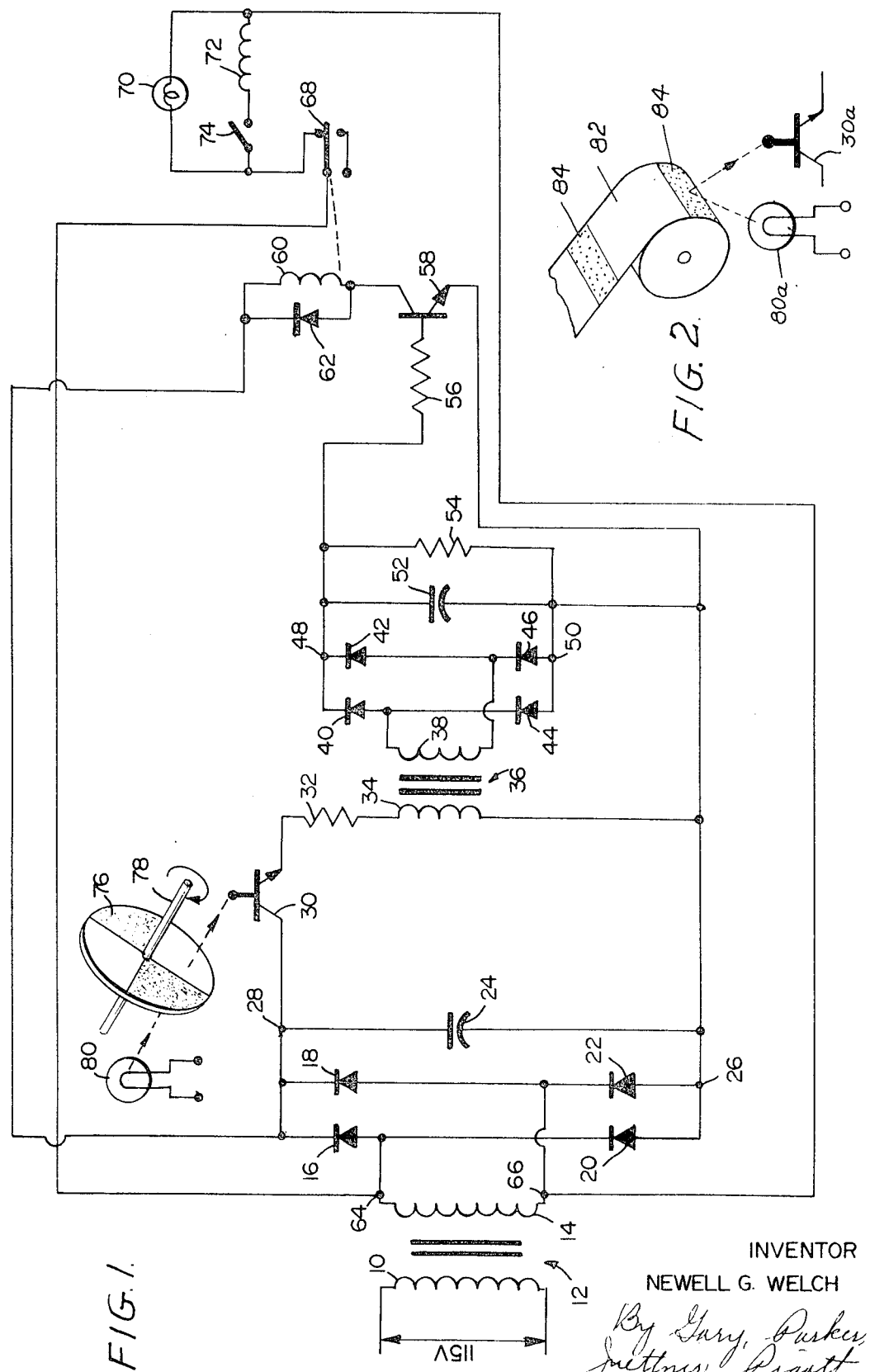
FIG. 1 is a schematic wiring diagram of the motion detector system of the present invention.
FIG. 2 is an alternate embodiment of a detail of the system of FIG. 1.

The motion detector circuit of the present invention is particularly adapted to monitor the rotary members used with a conveyor drive system, such as the drive motor or its associated pulley or sprocket drive means. However, it will be appreciated that the invention is not limited thereto but may be used, as described in detail below, to monitor any rotating member.

The motion detector circuit of the present invention is illustrated in the drawing.

A 120-volt AC source of supply is connected to the primary coil 10 of a stepdown transformer 12. The secondary coil 14 is coupled to a full wave bridge rectifier comprising diodes 16, 18, 10, and 22. A capacitor 24 is coupled across the diagonals of the bridge at terminals 26 and 28. Also connected across these terminals 26 and 28 is a series circuit including light-sensitive transistor 30, resistor 32 and the primary coil 34 of the transformer 36. The secondary coil 38 of transformer 36 is connected to a second bridge comprised of diodes 40, 42, 44, and 46. Coupled across the diagonals of the bridge at terminals 48 and 50 is a filter capacitor 52 and resistor 54. A resistor 56 is connected between the bridge at terminal 48 and the base of transistor 58, the emitter of which is coupled to the first bridge at terminal 26 and the collector of which is connected to relay coil 60. A diode 62 is in parallel with relay coil 60 which is connected across the bridge circuit. An alarm circuit is connected back to the secondary coil 14 of transformer 12 at terminals 64 and 66. The alarm circuit includes normally closed relay contact 68 and alarm lamp 70 and alarm buzzer 72. A switch 74 is connected in series with buzzer 76 so the current flow through the buzzer may be interrupted without deenergizing the alarm lamp 70.

A light source 80 permits light to periodically impinge on light-sensitive transistor 30. One way in which this is accomplished is to interrupt the light by means of a rotatable mask 76 which is adapted to be attached to the rotatable device (not shown) being monitored by means of a shaft. The mask 76 includes alternate sections of transparent and opaque material which chops the light beam from the lamp as it falls on the transistor 30.

A separate interrupter is not necessary of the spokes of a pulley on the device being monitored is used to interrupt the light beam.

Still another way of periodically interrupting and impinging light on the photosensitive device 30a is shown in FIG. 2. Where the device 30a is of the retroreflective type, a solid web pulley 82, or length of belt attached to the device being monitored is provided with a plurality of reflective tape patches 84 or reflectors which periodically reflect the light from the source 80a to the photosensitive device 30a.

The operation of the motion detector circuit may be described as follows. When transformer 12 is energized, a 12-volt output at the transformer secondary is rectified and applied to transistor 30. During normal operating conditions the machine being monitored will be rotating which in turn will rotate shaft 78 and mask 76. The light beam from lamp 80 will be chopped and applied to the light-sensitive area of transistor 30 to cause it to alternately conduct and turn off. The chopped DC voltage is then applied to the primary of transformer 36. The chopped signal is seen by the transformer 36 as an AC signal causing a voltage to be induced in its secondary coil 38. This voltage, in turn, is again rectified by the second bridge circuit, filtered by capacitor 52 and applied through resistor 56 to the base of transistor 58 to render it conducting. Since the relay 60 is connected to the input circuit at the first bridge circuit, conduction of transistor 58 completes a circuit through relay 60 which opens normally closed contact 68 in the alarm circuit to keep the alarm lamp 70 and buzzer 72 deenergized. If the machine being monitored stops rotating and causes the mask 76 to stop rotating the light beam from lamp 80 is no longer chopped and transistor 30 is either on and conducting or off and nonconducting depending upon the position of the mask 76 when it stops rotating. The system is fail-safe, for in either case, the transformer no longer sees a series of voltage pulses at its primary winding 34 and no voltage is induced in the secondary winding 38. This renders transistor 58 nonconducting, which in turn deenergizes relay 60 and closes contact 68 to complete the alarm circuit through the lamp 70 and buzzer 72. The buzzer 72 may be deactivated with switch 74 (shown open), however, the lamp 70 will remain lit until the circuit is reenergized by the commencement of rotation of the light-interrupting mask 76.

When the reflective belt 82 shown in FIG. 2 is used, light still is periodically impinged on and interrupted at the photosensitive device 30a and thus, the circuit operates in the same manner as described above.

What is claimed is:

1. A motion detector for providing an alarm signal when a rotary member being monitored is stopped comprising a DC power source, and AC transformer having its primary coupled to said power source, means for producing a periodic pulse signal to said transformer primary from said DC source, said means including a light source, a light-sensitive transistor conductive in the presence of light and nonconductive in the absence of light, rotary light-interrupting means coupled to said member being monitored and disposed between said light source and said transistor for causing periodic energization and deenergization of said transistor when said member is rotating, said transistor being connected in circuit with said DC source and the transformer primary for producing a periodic pulse signal in said primary when said member is rotating and whereby stopping of said member results in continuous energization or continuous deenergization of said transistor, cutting off said periodic pulse signal to the transformer an alarm circuit including a relay adapted to cause an alarm upon deenergization thereof, said relay including a coil in series circuit with said DC source, a switching transistor having its emitter and collector in series circuit with said relay coil and its base coupled to the secondary of said transformer, and a bridge circuit between said secondary and said base including full wave rectifier means and a smoothing capacitor for providing a steady DC signal to said base to render said switching transistor conductive when said member is rotating and said light-sensitive transistor is producing a pulse signal to said transformer, said switching transistor being rendered nonconductive when there is no pulse signal at the transformer whereby to cause an alarm to be given when said member is stopped.

2. The detector of claim 1 wherein said rotary light-interrupting means comprises a rotary mask formed of alternate sections of transparent and opaque material which alternately interrupt and transmit light between said light source and said light-sensitive transistor.

3. The detector of claim 1 wherein said rotary light-interrupting means comprises a moving belt carrying a plurality of reflective elements to periodically reflect light from said source to said light-sensitive transistor.

* * * * *